May 30, 1933.  A. R. MORRILL  1,911,283
MACHINE FOR USE IN THE MANUFACTURE OF SHOES
Filed Oct. 25, 1930  6 Sheets-Sheet 5

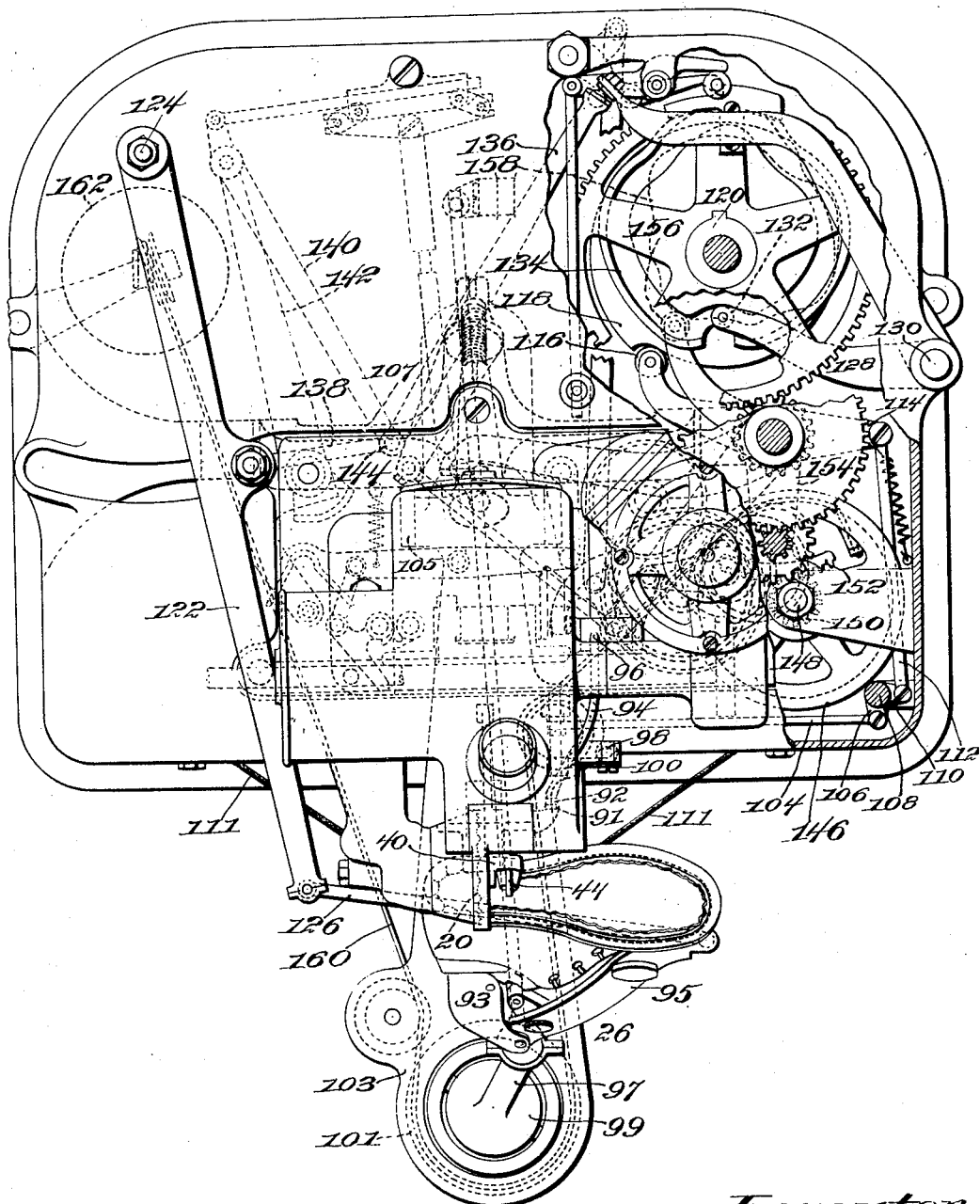

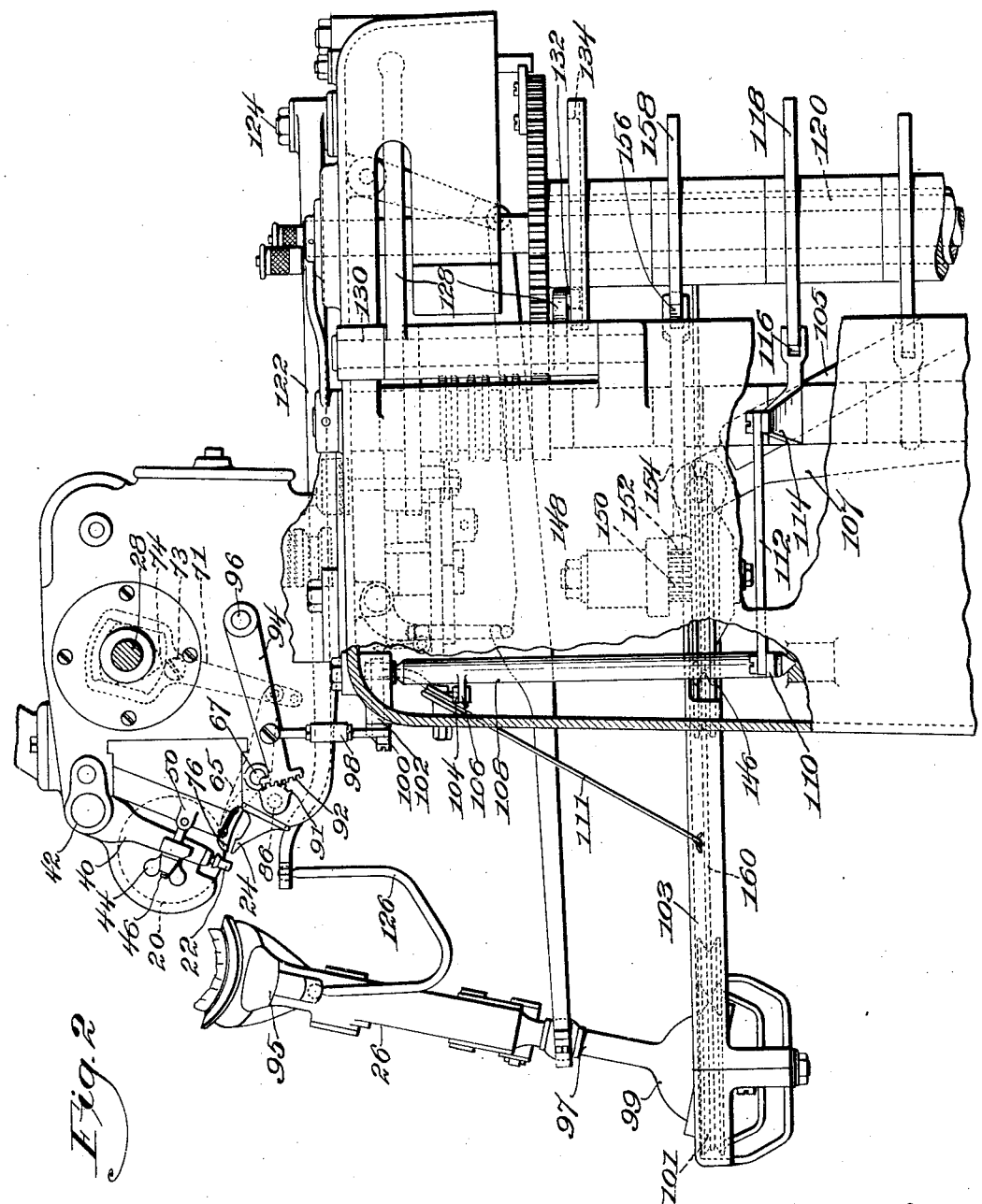

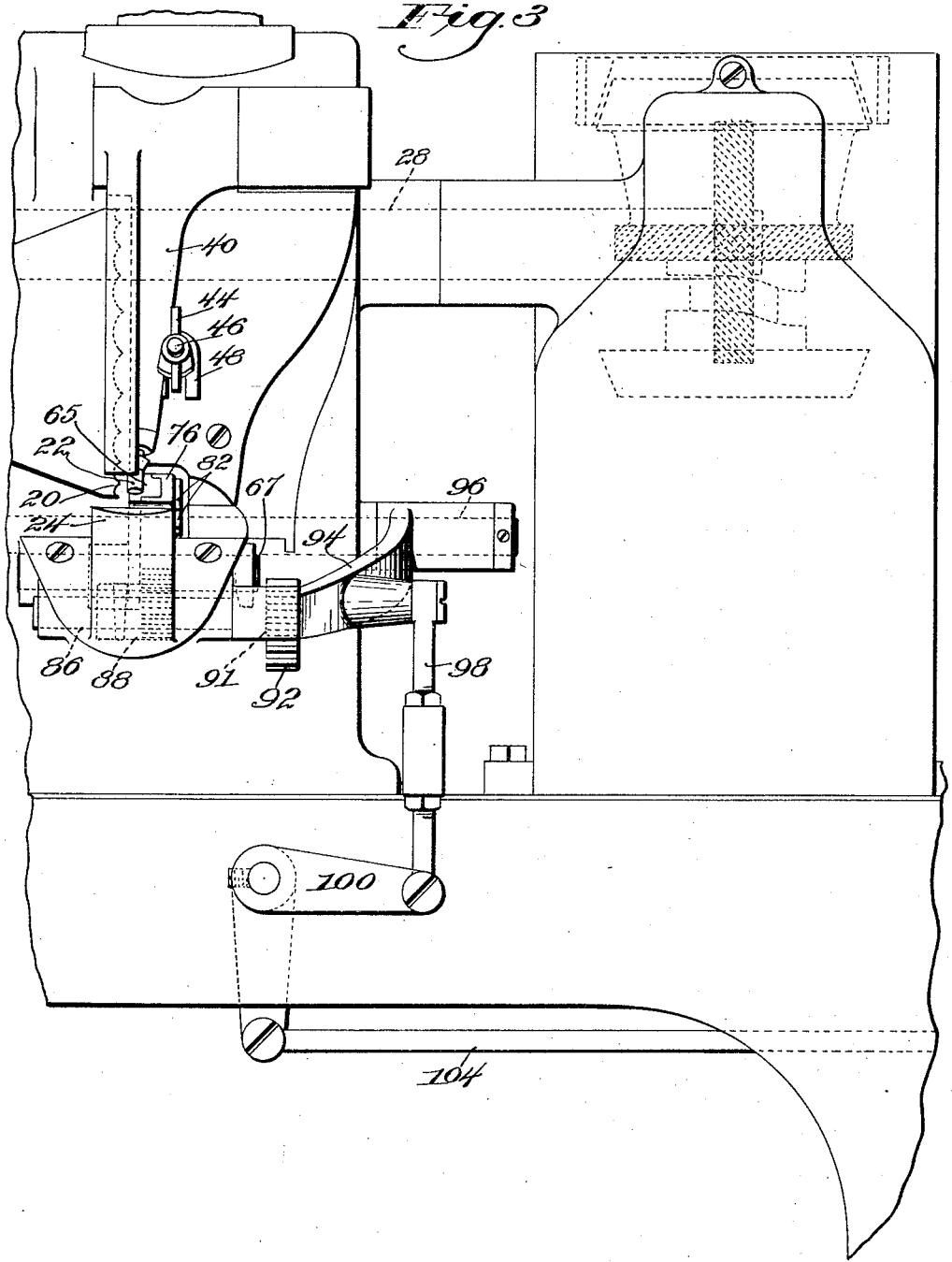

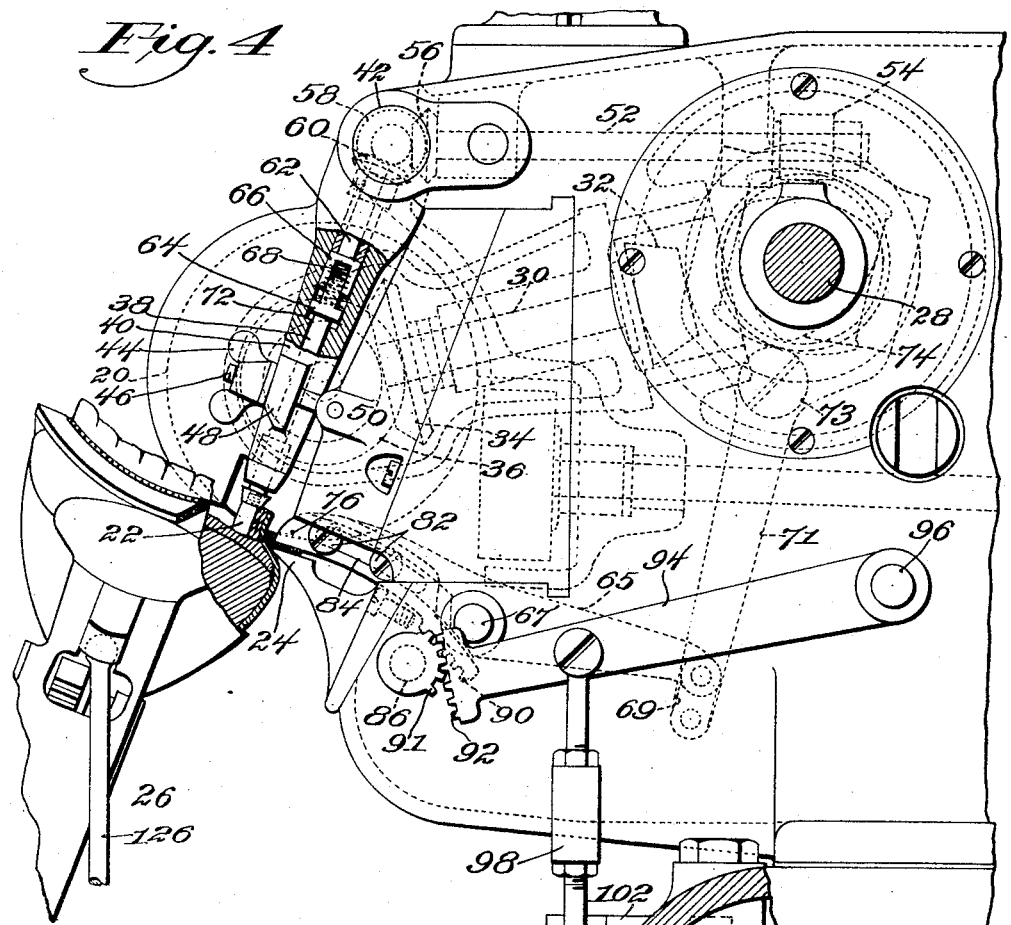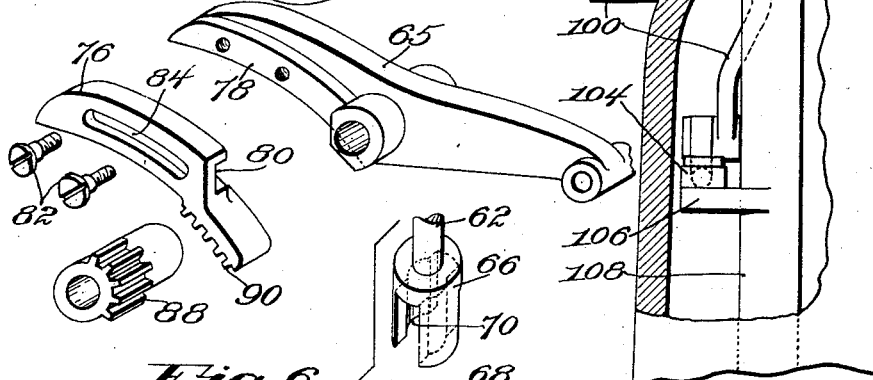

Witness
Jas. J. Maloney

Inventor
Alfred R. Morrill
by Van Everen Fisk
Hildreth & Leary Attys.

May 30, 1933.                A. R. MORRILL                1,911,283
MACHINE FOR USE IN THE MANUFACTURE OF SHOES
Filed Oct. 25, 1930          6 Sheets-Sheet 6

Witness
Jas. J. Maloney

Inventor
Alfred R. Morrill
by Van Everen Fish
Hildreth Heary Attys.

Patented May 30, 1933

1,911,283

UNITED STATES PATENT OFFICE

ALFRED R. MORRILL, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR USE IN THE MANUFACTURE OF SHOES

Application filed October 25, 1930. Serial No. 491,094.

The present invention relates to machines for use in the manufacture of shoes and is herein disclosed as embodied in a machine for trimming the inseam and beating out the welt and the inseam of a welt shoe.

The invention is intended primarily as an improvement on the automatic inseam trimming machine disclosed in the patent to A. R. Morrill No. 1,689,594, dated October 30, 1928. Certain features of the invention, however, are not limited to the machine herein disclosed but are equally applicable to inseam trimming machines which are not automatic, and to automatic machines for performing operations other than inseam trimming in the manufacture of shoes.

The machine of the Morrill patent above referred to is an automatic machine of the type which comprises a shoe supporting jack and automatic mechanism cooperating with suitable work guiding devices to impart movements to the jack to present the shoe properly to the operating devices as the point of operation is passed about the shoe. In the machine of the patent, the operating devices comprise a cylindrical or crown shaped inseam trimming knife and a beater which is adapted to pound or beat out the welt simultaneously with the inseam trimming operation.

One object of the present invention is to improve the construction and mode of operation of an inseam trimming machine of this general description, and more particularly to enable such a machine to pound down as well as trim the inseam of a shoe.

Another object of the invention is to produce an inseam trimming machine having a simple, efficient and novel mechanism for beating out the welt and trimmed inseam of a shoe.

A further object of the present invention is to produce a novel and improved automatic machine for operating upon shoes in which provision is made for imparting relative positioning and feeding movements to the shoe and the operating devices to transfer the point of operation about the shoe a plurality of times to perform successive operations on the shoe.

Figure 7:
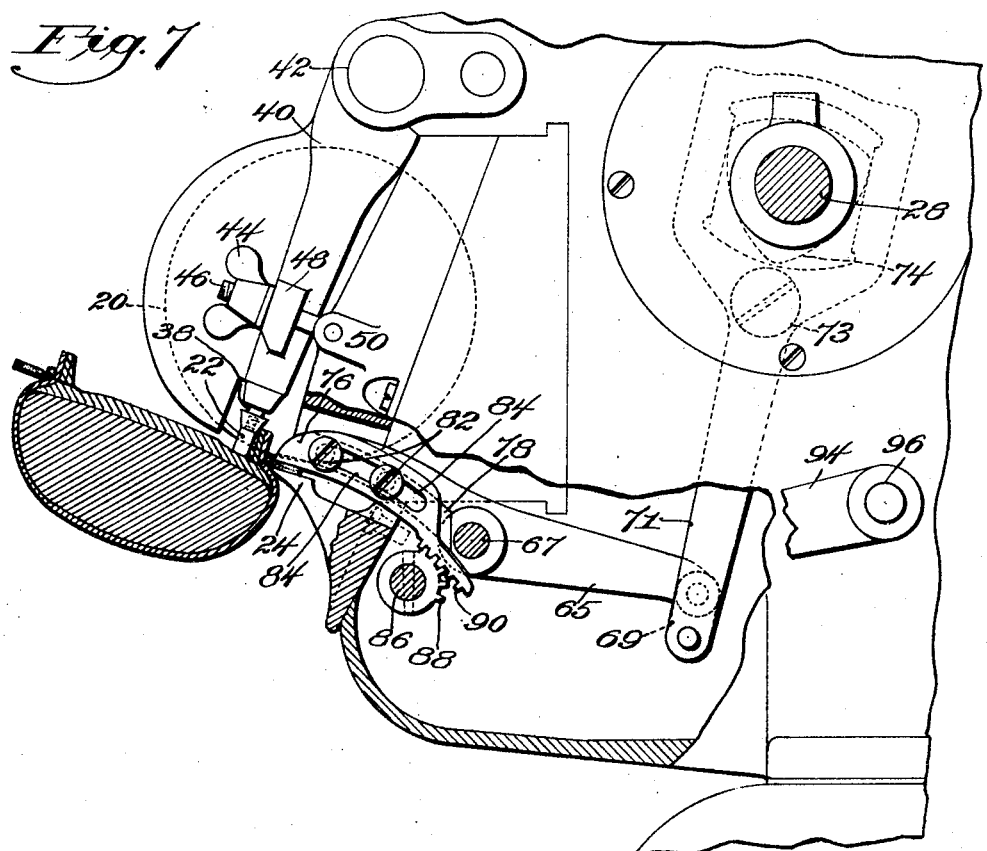
Figure 8:
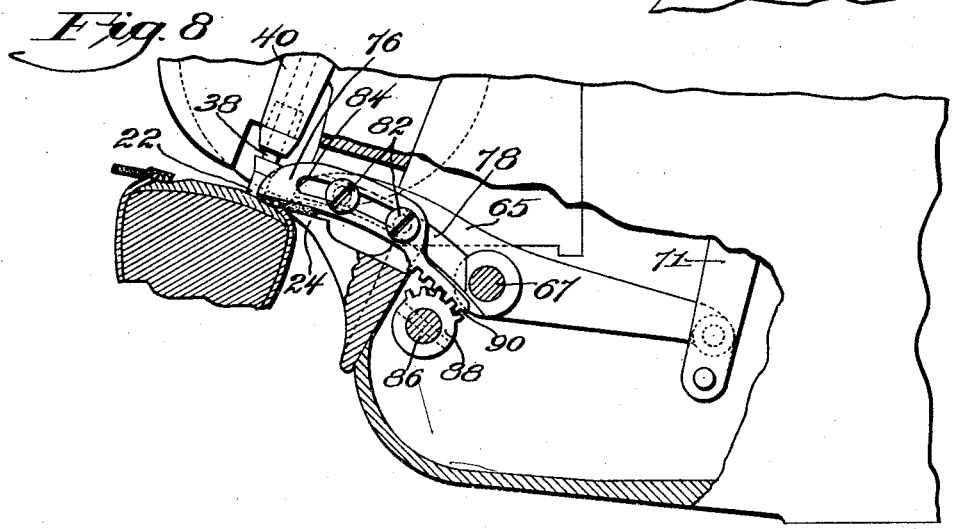
Figure 9:
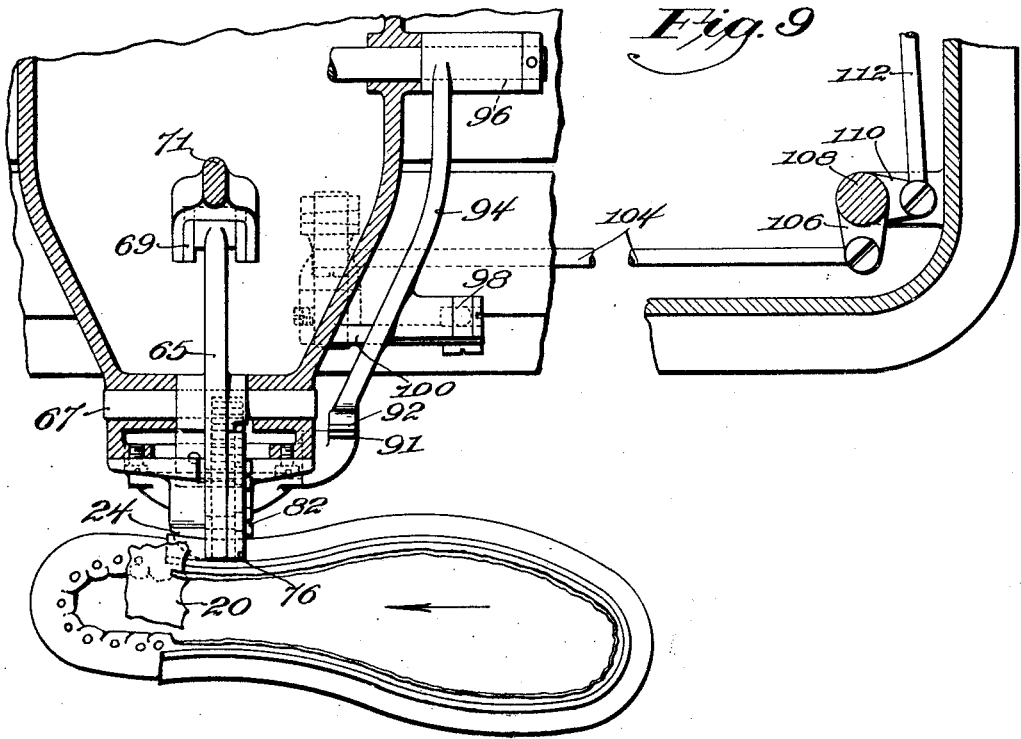
Figure 10:
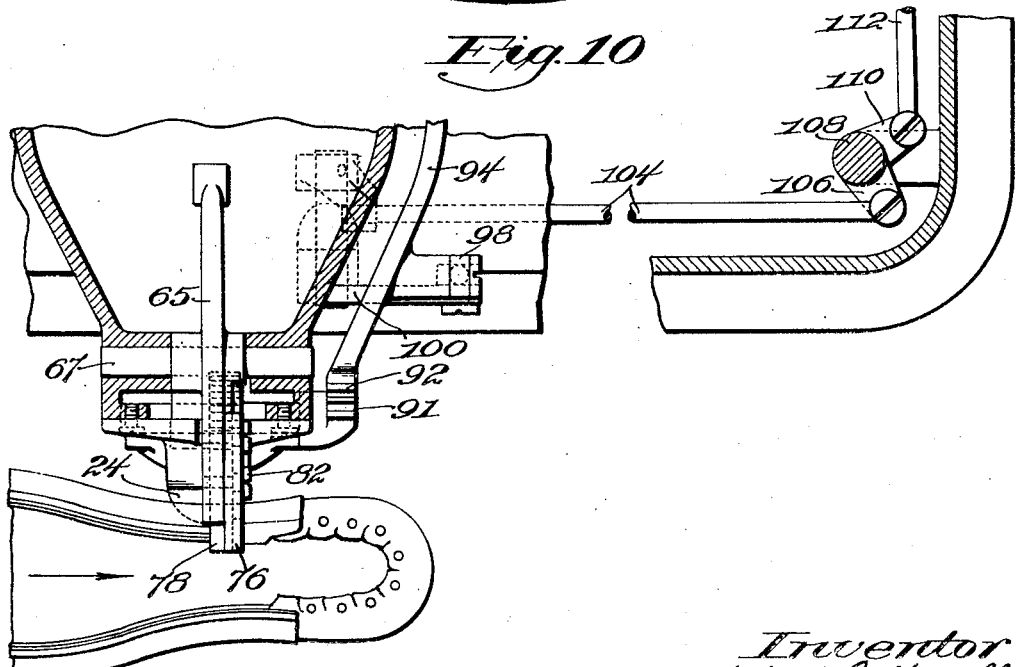

With these and other objects in view, as will hereinafter appear, the several features of the invention consist in the devices, combinations and arrangement of parts hereinafter described and claimed which, together with the advantages to be obtained thereby, will be readily understood by one skilled in the art from the following description taken in connection with the accompanying drawings in which Fig. 1 is a plan view of an automatic inseam trimming machine, part of the machine casing being cut away to show underlying parts; Fig. 2 is a view in right side elevation of the machine with a portion of the casing broken away to show underlying parts; Fig. 3 is a detail view in front elevation illustrating particularly the work engaging devices and more particularly mechanism for positioning the pounding element; Fig. 4 is a view in right side elevation of the head of the machine with a shoe in operating position and the pounding element positioned to beat out the welt; Fig. 5 is a detail perspective view of the beater lever, the pounding element mounted thereon, and the pinion for positioning the pounding element, these parts being separated laterally to indicate more accurately the cooperative relationship of the parts; Fig. 6 is a detail view, with the parts separated, of certain of the connections through which the channel guide roll is actuated; Figs. 7 and 8 are detail views in right side elevation illustrating the different positions of the shoe and operating devices during the welt beating and inseam pounding operation, Figure 7 illustrating the relative positions during the inseam trimming and welt beating operation, and Figure 8 illustrating the relative positions during the subsequent operation of pounding down the inseam; Fig. 9 is a plan view in section of the parts in the position shown in Fig. 7; and Fig. 10 is a sectional view of the parts in the position shown in Fig. 8.

The inseam trimming machine herein disclosed as embodying the several features of the present invention is provided with a cylindrical inseam trimming knife 20, a channel guide 22, a crease gage 24 which also serves as a support or anvil for the welt beating operation, and a work supporting jack indicated generally at 26, these parts having substantially the same construction and cooperative relationship as in the patent to Morrill above referred to.

In carrying out one feature of the present invention, a novel and improved pounding mechanism has been provided which is adapted selectively to beat out the welt and to pound down the inseam subsequently to the trimming operation. This mechanism comprises a vibratory pounding member which is positioned to beat out the welt in the usual manner during the inseam trimming operation and is thereafter moved relatively to the work guiding devices and the shoe into position to pound down the inseam.

In adapting the automatic machine of the Morrill patent for use with the mechanism for pounding the welt and the inseam herein disclosed, the automatic devices for feeding, turning and tipping the shoe supporting jack have been constructed and arranged to transfer the point of operation about the shoe a second time to permit the performance of successive operations on the shoe. The jack is rotated through approximately 180° while the point of operation is transferred along the side of the shoe, around the toe, and back along the other side, and is then rotated in a similar manner in the reverse direction to bring the point of operation back to starting position, while maintaining the shoe at all times in contact with the guiding devices.

The inseam trimming knife 20 is driven in the usual manner from the main cam shaft 28 through connections generally indicated in dotted lines in Fig. 4, comprising a shaft 30 which is provided at one end with a bevel gear 32 engaging with a corresponding gear on the cam shaft 28 and at its other end is provided with another bevel gear 34 engaging with a corresponding gear 36 secured to rotate with the knife.

The channel guide roll 22 is secured to the lower end of a shaft 38 mounted to rotate in a housing 40 which is supported at its end to turn on a pivot 42. The roll is readily adjusted toward and away from the machine to cause it to be brought accurately into engagement with the inside of the inseam, as shown in Fig. 4, by means of a wing nut 44 which is threaded onto a pin 46 extending through a bracket 48 on the casing 40 and at its inner end pivotally mounted on a bracket 50 on the machine frame. The roll 22 is given a continuous rotary movement from the cam shaft 28 through connections which comprise a horizontally arranged shaft 52 provided at one end with a worm gear 54 which engages a corresponding spiral gear on the shaft 28, and at its other end is provided with a bevel gear 56 which meshes with a corresponding bevel gear 58. The gear 58 in turn meshes with a corresponding bevel gear 60 secured to the upper end of a shaft 62 which abuts and is keyed to turn with the shaft 38 carrying the guide roll 22.

In order to maintain the channel roll 22 at all times in engagement with the work, regardless of variations in the thickness of the stock and in the position of the shoe as it is fed to the work operating devices, and more particularly to make certain the engagement of the roll with the insole lip during the inseam pounding operation after the inseam has been trimmed as hereinafter described, the shaft 38 is adapted for a short lengthwise movement and is forced yieldingly toward its lower position. The shaft 38 is provided at its upper end with an enlarged head 64 which carries upwardly extending flanges adapted to engage with slots formed in a corresponding head 66 on the lower end of the shaft 62 so that the two shafts are at all times keyed to turn together while permitting a lengthwise movement of the lower shaft 38. A compression spring 68 mounted in a recess 70 bored along the axis of the shafts 38 and 62 tends to move the shaft 38 and roll 22 to maintain a constant contact with the work. This movement of the shaft 38 is positively limited by the engagement of the head 64 with a corresponding shoulder 72 formed by the upper end of the bearing for the shaft 38 in the casing 40.

The pounding mechanism comprises a beater lever which is pivotally mounted at 67 on the machine frame and at its rear end is connected by a short downwardly extending link 69 with the lower end of the vibrating lever 71. This lever is pivotally mounted at 73 and at its upper end takes the form of a frame which embraces a three-faced cam 74 on the cam shaft 28. For a more complete description of the structure and mode of operation of this mechanism to impart the vibratory pounding motion to the beater lever 65, reference may be had to the above-mentioned patent to Morrill.

In embodying one feature of the present invention, in the illustrated machine, a pounding surface is formed on a separate pounding member 76 which is mounted to slide on the forward end of the beater lever 65. A tongue 78 is formed on one side of the beater lever 65 and is adapted to engage with a corresponding groove 80 formed in the pounding member 76. These parts are held in engagement by means of two screws 82 which extend through a slot 84 in the pounding member 76 and are threaded into the tongue 78 of the beater lever 65. The pounding member 76 is movable along the tongue 78 to locate the pounding surface in either of two positions in one of which positions it is adapted to act on the welt and in the other of which positions it is adapted to act on the trimmed inseam. The two positions of the pounding member 76 are indicated in Figs. 7 and 8, the member being in the position indicated in Fig. 7 during the forward movement of the shoe in transferring the point of operation about the shoe, in which position it acts to beat out the welt simultaneously with the trimming of the inseam, and the member being in the position indicated in Fig. 8 during the reverse or return movement of the shoe in which position it acts to pound or beat out the previously trimmed seam. The pounding member is moved from one of these positions to the other by means of mechanism comprising a rock shaft 86 journaled in the machine frame and provided with a gear segment 88 which meshes with a corresponding rack 90 formed on the rear end of the pounding member 76. A second gear segment 91 is formed on the shaft 86 and engages with a gear segment 92 formed on the end of a lever arm 94 loosely sleeved on a shaft 96. The lever arm 94 is in turn connected by means of a vertically situated link 98 with one arm of a bell crank lever 100 which is mounted in a bearing 102 in the machine frame. The other arm of the bell crank 100 is connected by means of a link 104 to a short arm 106 secured to the upper end of a vertical rock shaft 108 which at its lower end carries a second arm 110. A link 112 is secured at one end of the lever arm 110 and at its other end to the free end of a cam lever 114 which carries a cam roll 116 adapted to engage with a cam 118 on the pattern cam shaft 120 from which the shoe supporting jack of the machine is actuated and controlled.

The jack for supporting the lasted shoe during the operation of the machine is similar to that of patent hereinbefore referred to and is actuated and controlled in a substantially similar manner. As illustrated, the jack comprises a heel support 93 and a toe rest 95 which is formed on the upper end of a spindle 97. The lower end of the jack spindle is secured to a hemispherical shell or casing 99 connected by means of a gimbal joint with a wheel 101 which is mounted to rotate on a vertical axis in a casing carried at the forward end of a supporting arm 103, the rear end being mounted to swing vertically about an axis at the upper end of a support 105. The support 105 is pivoted on a second support 107 to swing laterally of the machine, the support 107 in turn being mounted to swing forwardly and rearwardly so that the spindle at its lower end may be moved in any required direction to impart the required tipping and positioning movements to the jack as the point of operation is transferred about the shoe. The jack spindle is yieldingly supported vertically by means of two cords 111 which are secured to the arm 103 and pass upwardly over pulleys to a counter-weight not shown.

During the operation of the machine on the shoe, the shoe is held at all times by the guides engaging the shoe at the point of operation comprising the crease guide 24 and the channel guide roll 22. The jack in the present machine is balanced to impart a slight downward movement of the jack to maintain the shoe at all times in operative engagement with the crease guide 24.

Tipping and positioning movements are imparted to the shoe to change the relative positions of the shoe and the devices for operating upon it to compensate for the longitudinal and transverse surface curvatures and the edge curvatures of the shoe sole as the point of operation of the operating devices is transferred about the shoe through mechanism controlled by cams on the pattern cam shaft 120.

Feeding movements are imparted to the jack through connections comprising a feed lever 122 which is mounted at its rear end to turn on a pivot 124 and at its forward end is connected by means of the link 126 with the toe support 95 of the jack. The feed lever 122 is actuated by means of a cam lever 128 which is sleeved on a vertical pivot shaft 130 and comprises two arms, one being provided with a cam roll 132 to engage with a closed cam groove 134, and the other being connected by means of the links 136 and 138 with the feed lever 122. A link 140 pivoted on a feed adjusting member 142 and connected at its forward end to the pivotal connection 144 of the links 136 and 138 acts to determine the path of the pivot 144 and thus to determine the extent of the feeding movement imparted to the shoe.

Turning movements are imparted to the jack by mechanism controlled from the pattern cam shaft of the machine and comprising a wheel 146 sleeved to rotate on a vertical pivot shaft 148 and having formed on its hub a pinion 150. Engaging with the pinion 150 is a gear segment 152 formed on one arm of a cam lever 154 which carries on its other arm a roll 156 adapted to engage with a corresponding peripheral cam surface formed on the cam disk 158. The wheel 101 is connected to turn with the wheel 146 by means of a cord 160 which is secured to the wheel 146 and is guided around the wheel 101 over idler pulleys to a counter-weight 162, as shown in Fig. 1.

In the operation of shoes machines previously developed employing a shoe supporting jack and automatic mechanism for imparting feeding, tipping, and turning movements to the shoe to present the shoe properly to the shoe operating devices as the point of operation is transferred about the shoe, the jack and the shoe supported thereon are turned slowly through approximately 180° as the point of operation is transferred around the shoe and are then moved out of engagement with the shoe operating devices and rotated rapidly in a reverse direction back to starting position preparatory to placing a new shoe in the machine. In the illustrated machine, however, in order to permit two or more operations to be performed successively on the shoe, these operations in the present instance being first an inseam trimming operation and then an inseam pounding or beating out operation, the mechanisms for actuating and controlling the jack are constructed and arranged to cause the point of operation to be transferred twice around the shoe. To this end the pattern cam shaft is operated at approximately half the normal speed employed in the machine of the Morrill patent above referred to and the actuating and controlling cams mounted thereon are shaped to cause the point of operation to be transferred about the shoe during one-half revolution of the cam shaft and then to be transferred in a reverse direction to starting position during the second half revolution of the cam shaft, the shoe during both transfers being maintained in the proper position with relation to the operating devices. The stop mechanism is then thrown into operation and an auxiliary mechanism is rendered operative to move the jack and the shoe out of engagement with the operating devices and to complete the rotation of the pattern cam shaft to its original starting position in the usual manner as illustrated in the above-mentioned patent.

The nature and scope of the invention having been indicated and a machine embodying the several features of the invention having been specifically described what is claimed is:

1. A machine for operating upon shoes having, in combination, means for operating upon a shoe comprising an inseam trimming knife and a beater to beat the welt, means for positioning the shoe with relation to the said operating means during the transfer of the point of operation about the sole of the shoe to cause the beater to beat the welt, and means for changing the relative positions of the said positioning means and beater to cause the beater to pound the inseam subsequently to the trimming operation.

2. A machine for operating upon shoes having, in combination, means for operating upon a shoe comprising an inseam trimming knife and a beater to beat the welt, work guiding devices for positioning the shoe with relation to the operating means, and means for changing the position of the beater with relation to the work guiding devices to cause the beater to pound the welt during the trimming operation and thereafter to pound the inseam.

3. A machine for operating upon shoes having, in combination, means for operating upon a shoe comprising an inseam trimming knife, a beater to beat the welt, a shoe supporting jack, means for moving the shoe relatively to the said operating means to transfer the point of operation about the shoe and thereafter to cause the point of operation to be transferred about the shoe a second time, and means for controlling the position of the beater to beat the welt during the inseam trimming operation and thereafter to pound the inseam during the relative movement of the shoe and the operating means to transfer the point of operation about the shoe the second time.

4. A machine for operating upon shoes having, in combination, means for operating upon a shoe comprising an inseam trimming knife, a beater to beat the welt, work guiding devices for positioning the shoe with relation to the operating means, a shoe supporting jack, means for relatively moving the shoe and operating means to transfer the point of operation about the shoe and return, and means for positioning the beater to pound the welt during the relative movement of the work and the operating devices to trim the inseam and during the return movement of the parts to position the beater to pound the trimmed inseam.

5. A machine for operating upon shoes having, in combination, means for operating upon a shoe comprising an inseam trimming knife, a beater, work guiding devices for positioning the shoe with relation to the operating means, a shoe supporting jack, means for moving the shoe with relation to the operating means to transfer the point of operation about the shoe and return, and means for causing the trimming knife to trim the inseam during the relative movement of the shoe and the knife, and on the return movement to cause the beater to beat the trimmed inseam.

6. A machine for operating upon shoes having, in combination, means for operating upon a shoe, a shoe supporting jack, work guiding devices in contact with which the shoe is moved, means for moving the shoe relatively to the operating means to transfer the point of operation about the shoe, and thereafter during the continued operation of the machine to cause the point of operation to be transferred about the shoe a second time to perform successive operations on the shoe.

7. A machine for operating upon shoes having, in combination, work supporting and guiding devices and a pounding mechanism cooperating therewith to pound the shoe comprising a beater lever, a pounding member mounted on the lever and movable thereon from one position to another during the continued operation of the machine to pound different portions of the shoe held on the support, and means for controlling the position of the pounding member.

8. A machine for operating upon shoes having, in combination, work supporting and guiding devices and a pounding mechanism cooperating therewith to pound the shoe comprising a beater lever, a pounding member mounted on the lever and movable thereon to pound selectively the welt and inseam portions of the shoe, and means for automatically controlling the position of the pounding member to pound successively the welt and the inseam.

9. A machine for operating upon shoes having, in combination, work supporting and guiding devices and a vibratory beater member past which the shoe is moved during the operation of the machine, said member being movable during the operation of the machine from one position to another to pound selectively the welt and the inseam.

10. A machine for operating upon shoes having, in combination, means for operating upon a shoe comprising an inseam trimming knife, a beater lever, a pounding member mounted on the lever and movable thereon, work guiding devices for positioning the shoe with relation to the operating means, a shoe supporting jack, means for relatively moving the shoe and operating means to transfer the point of operation about the shoe and return, and means for controlling the position of the pounding member on the beater lever to pound the welt during one relative movement of the shoe and the operating means and to pound the inseam during the return relative movement of the parts.

11. A machine for operating upon shoes having, in combination, means for operating upon a shoe comprising an inseam trimming knife, a crease guide, a beater cooperating therewith to beat the welt, a channel guide comprising a rotary roll, and yielding means pressing the roll axially against the work.

12. A machine for operating upon shoes having, in combination, means for operating upon a shoe comprising an inseam trimming knife, a crease guide, a channel guide arranged to engage the channel of the insole and to cooperate with the crease guide to position the shoe with relation to the trimming knife, said guide being mounted for movement toward and away from the work in a direction perpendicular to the sole surface, and spring means adapted to hold the channel guide yieldingly in engagement with the work.

13. A machine for operating upon shoes having, in combination, means for operating upon a shoe, a shoe supporting jack, work guiding devices in contact with which the shoe is moved, means for moving the shoe relatively to the operating means to transfer the point of operation about the shoe, and thereafter to cause the point of operation to be transferred about the shoe a second time in the reverse direction.

14. A machine for operating upon shoes having, in combination, means for operating upon a shoe comprising an inseam trimming knife, a beater, means for moving the shoe relatively to the operating means to transfer the point of operation of the trimming knife about the shoe to trim the inseam and thereafter to cause the point of operation of the beater to be transferred about the shoe to beat out the trimmed inseam.

15. A machine for operating upon shoes having, in combination, means for operating upon a shoe, a shoe supporting jack, work guiding devices in contact with which the shoe is moved, means for moving the shoe relatively to the operating means to transfer the point of operation about the shoe and thereafter, during the continued operation of the machine, to cause the point of operation to be transferred about the shoe a second time to perform successive operations on the shoe, and means for imparting positioning movements to the shoe to present the shoe properly to the operating means during both transfers.

16. A machine for operating upon shoes having, in combination, means for operating upon a shoe, a shoe supporting jack, work guiding devices in contact with which the shoe is moved, means for moving the shoe relatively to the operating means to transfer the point of operation about the shoe and thereafter to cause the point of operation to be transferred about the shoe a second time in the reverse direction, and means for imparting positioning movements to the shoe to present the shoe properly to the operating means during both transfers.

In testimony whereof I have signed my name to this specification.

ALFRED R. MORRILL.